July 7, 1970 RYOJI TOKI 3,519,284
SLEIGH
Filed Sept. 27, 1968 2 Sheets-Sheet 1
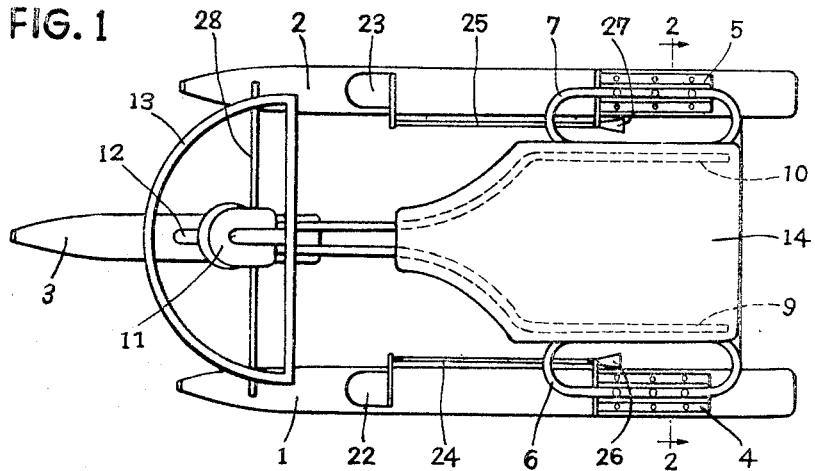
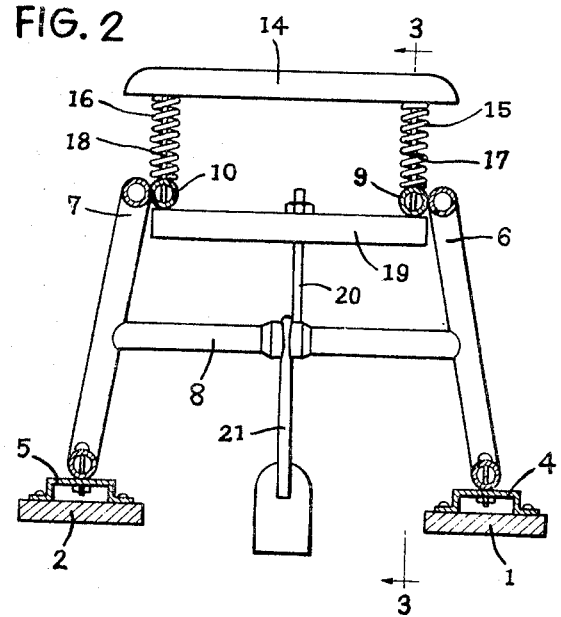
INVENTOR
Ryoji Toki July 7, 1970 RYOJI TOKI 3,519,284
SLEIGH Filed Sept. 27, 1968 2 Sheets-Sheet 2

INVENTOR

Ryoji Toki

United States Patent Office 3,519,284
Patented July 7, 1970

3,519,284
SLEIGH
Ryoji Toki, 3897 Kamitsuruma, Sagamihara-shi, Kanagawa, Japan
Filed Sept. 27, 1968, Ser. No. 763,113
Claims priority, application Japan, Sept. 27, 1967, 42/61,674
Int. Cl. B62b 17/08
U.S. Cl. 280—16                                    13 Claims

ABSTRACT OF THE DISCLOSURE

This invention relates to a sleigh having a piloting device for use in operation mainly on slopes of, and more particularly to a sleigh provided with a seat-interlocking brake linked mechanically with the driver's seat to halt the sleigh so as not to move of itself unless the weight of the driver is put on the said seat, and with independent foot brakes, one each on the right and left, to permit during operation the driver to voluntarily stop the sleigh or effect with the steering device the turning thereof.

BACKGROUND OF THE INVENTION

It has been fairly long since sleighs started to be used in the field of sports or amusement. But the history of improvement thereof does not date back so far, much less with types of those characterized by the use of a steering device, the realization of which belongs to a relatively recent trend. But since the embodiment of the latter types of sleighs, an overwhelming increase has occurred in number of persons who use sleighs. It is understood that steering types of sleighs enable the users to choose the course of sliding freely as well as to run straight, and at the same time they give the user the excitement of using the skill of sliding. On the other hand, an increase in bodily injuries and other accidents caused by the use of such advanced types of sleighs is a trend which should not be overlooked. This is due to the fact that, although the sleighs are originally intended for use on slopes upon which they slide at high speeds, they are conventionally not provided with means for halting them when left unused nor for stopping them safely and securely during operation, thus leading to injuries caused by uncontrolled running of empty sleighs or by mishandling by less experienced drivers.

SUMMARY OF THE INVENTION

The general object of the present invention is to provide a sleigh which permits the complete elimination of such shortcomings of the conventional types of sleighs as aforementioned.

An object of the present invention is to provide a sleigh having a seat-interlocking brake which permits everyone to halt the sleigh on any slope without any particular operation and by merely leaving the seat, and at the same time to release the sleigh freely by merely sitting on the seat as the driver mounts thereupon without any operation.

Another object of the present invention is to provide a sleigh having two independent foot brakes, one each on the right and left, which permit the driver to work them separately during operation by using either of his both feet thereby each one of the said brakes functions alone or in collaboration to stop the sleigh in operation or to change the direction of sliding with or without maneuvering the steering device.

According to this invention, safety is obtained even in the event of the driver falling therefrom because braking action is effected by simply leaving the seat so that the empty sleigh without driver does not continue to run. This also means that a sleigh is obtained in a type which will not start running of itself when left unused.

Further according to this invention, a sleigh safely enables the driver to control the sliding speed thereof during operation by voluntarily and freely using the foot brakes and, if desired, to simultaneously work the seat interlocking brake by half rising his body above the seat.

Another characteristic feature of the sleigh in accordance with the present invention is to provide the driver a technical excitement of controlling the direction of sliding with or without using the steering device because the sleigh can be turned suddenly in the direction where either of the independent foot brakes on the right and left sides is used. Also in this case, since the shock of the turning force aroused when the sleigh suddenly turns by the use of either of these brakes is fairly large, a means may be employed to turn the seat slightly towards the opposite direction so as to alleviate such a shock and at the same time smoothly effect such a sudden turning of the sleigh.

BRIEF DESCRIPTION OF THE DRAWINGS

FIG. 1 is a plan view of a sleigh in accordance with the invention;
FIG. 2 is a sectional view on line 2—2 of FIG. 1.

DESCRIPTION OF THE PREFERRED EMBODIMENT

Figure 3:
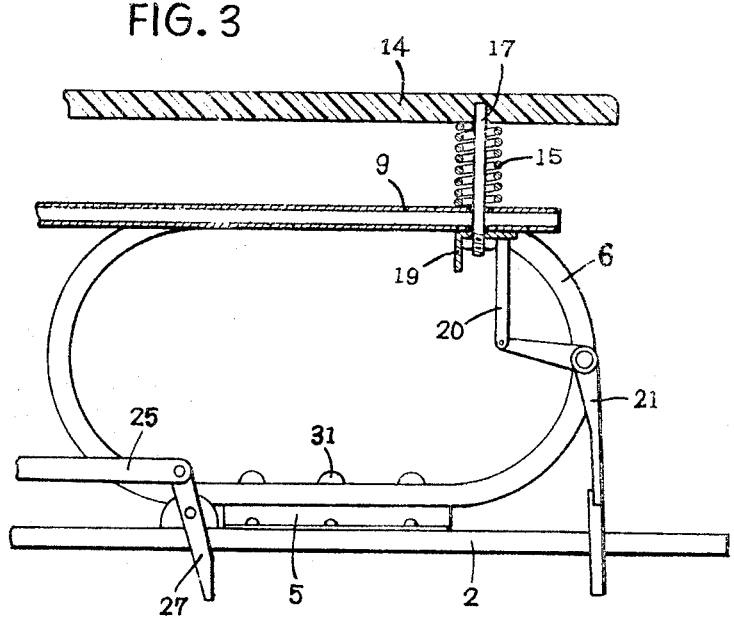
FIG. 3 is a sectional view, somewhat enlarged, on line 3—3 of FIG. 2.

By way of the drawing, a practical embodiment of this invention will be hereinafter illustrated.

The sleigh has two parallel main runners 1 and 2 and a piloting or guide runner 3 arranged between and extending ahead of the two main runners. The said main runners 1 and 2 have at their top surfaces metal pieces 4 and 5 respectively with flanges which hold the supporting assembly arranged so as to rise over between the said main runners. The said supporting assembly is made up of two annular frames 6 and 7 respectively retained by the said metal pieces 4 and 5, a beam 8 laid between the frames, two connecting pieces 9 and 10 arranged ahead of each of the said circular frames toward the center between the frames, and a bearing 11 supported at the front ends of these connecting pieces. A steering column 12 is rotatably installed to the said bearing 11 to act in concert with the turning of the handle 13 mounted onto the upper end of the said column. In this case, it is noted that the said steering column arises aslant from the piloting runner 3 and is supported in relation to the said bearing 11 so as to be adapted to move somewhat longitudinally.

The driver's seat 14 is flexibly mounted at least three positions along its longitudinal direction of the said supporting assembly. The seat may be mounted onto any member of the assembly and is positioned on the two connecting pieces 9 and 10. Two mounting positions are shown in the drawing and it is evident that the seat is not directly fixed onto the connecting pieces but is supported by the springs 15 and 16 arranged between the seat and the connecting pieces so as to be cushioned against shocks from the supporting assembly by the flexibility of these springs.

This sleigh has a seat interlocking brake by which the said sleigh remains standstill unless the driver sits on the seat 14. The brake comprises a link mechanism wherein the brake plate 21 is a lever having its fulcrum at the beam 8 of the supporting assembly and thereby, in response to vertical movement of the link 20 connected with one end of the said brake plate, turns to cause the other end of the brake to be thrusted into the snow or removed therefrom. Bolts 17 and 18 of considerable length are provided extending from the said seat 14 through the aforementioned springs 15 and freely through and below the aforementioned connecting pieces 9 and 10, the said springs contracting as the driver sits upon the seat to cause the free other end of the brake plate 21 to be thrust into the distance between the seat and the connecting pieces. At the lower ends of the bolts 17 and 18, bar 19 is fastened with screws linking between these bolts. Similarly at the center of the said bar, the aforementioned link 20 is fastened. In effect, the link 20 is connected with the seat 14 and, therefore, if desired, the link may be directly connected and fastened to the said seat. If the link 20 is moved downward, the brake plate 21 will turn rearward from under the snow to release the sleigh. Otherwise, when the seat 14 is empty, the said link 20 will move upward by the force applied by the springs 15 and 16, whereby the brake plate 21 will halt the sleigh on the snow.

The sleigh has another kind of brake, i.e., foot brakes mounted one each onto the main runners 1 and 2. The said brakes have respective brake plates 26 and 27 connected by rods 24 and 25 with pedals 22 and 23 provided for the respective main runners, the pedals to be stepped on during operation whereby the brake plates are thrust into the snow whereas when the pedals are not worked, the brakes 26 and 27 will be withdrawn from the snow. As aforementioned, such foot brakes not only serve to brake the sleigh but also work effectively to turn the sleigh because they will change its direction of movement to the side of whichever of the foot brakes is used.

Figure 4:
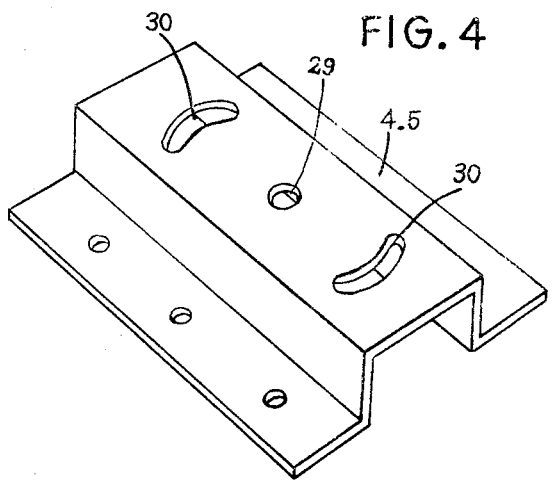
FIG. 4 is an oblique view of a supporting metal piece of the frame shown in each of the preceding figures.

In order to alleviate the shock applied on the sleigh as well as to turn the sleigh more effectively towards the foot brake side in case either of the foot brakes is used, this sleigh is provided with special arrangement to somewhat change the position of the seat assembly including the supporting assembly in relation to the main runners 1 and 2. In other words, when the frames 6 and 7 are fastened to the runners 1 and 2, the special metal pieces 4 and 5, as shown in FIG. 4 are employed to hold the said frames thereupon with three bolts 31 without tightly fastening the said frame onto the metal pieces so that the outer two bolts can move in the slots 30 of the said metal pieces wherein the center bolt is received in the round hole 29. It is noted that the connecting pipe 28 is laid between the two main runners 1 and 2 in order to keep the parallelism of the said runners even when the direction of the seat assembly is changed in relation to the said runners. When by the use of either of the foot brakes a shock is given to turn the main runner 1 and 2 to the side of the applied brake, a reaction force turns the seat assembly to the opposite side. Because the seat assembly slightly turns in relation to the main runners, shock transferred to the driver is alleviated and also the sleigh turns more smoothly to the desired directions.

What I claim is:

1. A sleigh for use on snow, comprising in combination, at least two runners arranged in parallelism with one another and in a common plane; support means including a pair of annular frames each mounted on one of said runners and extending upwardly therefrom in a second plane upwardly inclined with reference to said common plane; seat means carried by said support means for movement at least substantially normal to said common plane between an upper and lower position in which it is respectively farther from and closer to said runners; biasing means permanently biasing said seat means to said upper position thereof; at least one elongated brake member having a first portion mounted on said support means for turning movement about an axis upwardly spaced from said common plane and transverse to said second planes, and a free second portion projecting from said first portion for turning movement about said axis intermediate said second planes; and connecting means connecting said brake member with said seat means and operative for turning said brake member about said axis between an inoperative position in which said free second portion is withdrawn upwardly of said runners and an operative position in which it extends below said runners and penetrates the snow for braking the sleigh, in response to movement of said seat means from said upper to said lower position, and vice versa.

2. A sleigh as defined in claim 1, wherein said second planes extend at least substantially normal to said common plane.

3. A sleigh as defined in claim 2, said annular frames each having an upper portion provided with a bore extending normal to said plane; said seat means comprising at least two downwardly extending elongated projections each received and slidably guided in one of said bores; and said biasing means comprising at least two elongated helical expansion springs each surrounding one of said projections and bearing upon said seat means and the respective annular frame for urging said seat means to said upper position thereof.

4. A sleigh as defined in claim 3, said first and second portions of said brake member being inclined to one another and constituting a double-armed lever, and said connecting means comprising at least one elongated member having one end portion articulately connected to said first portion and an other end portion secured to said seat means.

5. A sleigh as defined in claim 3, said annular frames each having a central opening and said projections each having a lower portion projecting into the respective central opening when said seat means is in said upper position thereof; and further comprising a cross member extending from one to the other lower portion and secured to both so as to move with said projections in response to movement of said seat means between said upper and lower positions thereof.

6. A sleigh as defined in claim 5, wherein said connecting means comprises at least one elongated link member having one end portion rigid with said cross member, and an other end portion operatively associated with said first portion of said brake member.

7. A sleigh as defined in claim 6, said brake member being a double-armed lever with each of said positions constituting one arm and with said first position being mounted for turning movement about said axis proximal to the juncture with said second position.

8. A sleigh as defined in claim 1; and further comprising a steerable runner mounted for turning movement about an upright axis and at least in part projecting forwardly beyond said two runners.

9. A sleigh as defined in claim 1; and further comprising a pair of independently operating brakes each associated with one of said two runners.

10. A sleigh as defined in claim 9; said support means comprising a support element extending upwardly from each of said two runners, ad a mounting element connecting the respective support element with the associated runner with freedom of pivoting movment of said mounting elements in parallelism with said plane and in one lateral direction in response to movement of said runners in the opposite lateral direction.

11. A sleigh for use on snow, comprising in combination, at least two runners arranged in parallelism with one another in a common plane; independently operable runner brake means associated with each of said runners; support means mounted on said runners and extending upwardly therefrom, said support means comprising a pair of support elements extending upwardly from the respective runners and being elongated in the direction of the latter, and a pair of mounting elements mounted atop the respective runners and connecting the same to the associated support elements in such a manner as to afford said support elements freedom of pivoting movement in parallelism with said plane and in one lateral direction in response to movement of said runners in the opposite lateral direction resulting from operation of the runner brake means associated with the runner which faces said opposite lateral direction; seat means carried by said support means for movement at least substantially normal to said plane between an upper and a lower position in which it is respectively farther from and closer to said runners; biasing means permanently biasing said seat means to said upper position thereof; at least one elongated brake member having a first position mounted on said support means for turning movement about an axis upwardly spaced from and at least substantially parallel to said plane, and a free second portion projecting from said first portion; and connecting means connecting said brake member with said seat means and operative for turning said brake member about said axis between an operative position in which said free second position extends below said runners and penetrates the snow for braking the sleigh and an inoperative position in which it is withdrawn upwardly of said runners, in response to movement of said seat means from said upper to said lower position, and vice versa.

12. A sleigh for use on snow, comprising in combination, at least two runners arranged in parallelism with one another in a common plane; independently operable runner brake means associated with each of said runners; support means mounted on said runners and extending upwardly therefrom, said support means comprising a pair of support elements extending upwardly from the respective runners and being elongated in the direction of the latter, and a pair of mounting elements mounted atop the respective runners and connecting the same to the associated support elements in such a manner as to afford said support elements freedom of pivoting movement in parallelism with said plane and in one lateral direction in response to movement of said runners in the opposite lateral direction resulting from operation of the runner brake means associated with the runner which faces said opposite lateral direction, said mounting elements each being configurated as an elongated bracket extending longitudinally of the respective runner and having a circular aperture and at opposite longitudinal sides thereof respective arcuately curved slot-shaped apertures concentric with said aperture, and said support means further comprising bolt members rigid with the respective support elements and each received in one of said apertures whereby the bolt members received in said slot-shaped apertures are free to slide therein while the bolt members received in said circular aperture are free to turn therein; seat means carried by said support means; at least one elongated brake member having a first portion mounted on said support means for turning movement about an axis upwardly spaced from and at least substantially parallel to said plane, and a free second portion projecting from said first portion.

13. A sleigh as defined in claim 12, said seat means arranged for movement at least substantially normal to said plane between an upper and a lower position in which it is respectively farther from and closer to said runners; biasing means biasing said seat means to said upper position thereof; and connecting means connecting said brake member with said seat means and operative for turning said brake member about said axis between an operative position in which said free second position extends below said runners and penetrates the snow for braking the sleigh and an inoperative position in which it is withdrawn upwardly of said runners, in response to movement of said seat means from said upper to said lower position and vice versa.

References Cited

UNITED STATES PATENTS

| | | | |
|---|---|---|---|
| 194,498 | 8/1877 | Lemley | 188—8 |
| 1,242,990 | 10/1917 | Schwittal | 280—16 |
| 1,613,508 | 1/1927 | Gardner | 188—8 |
| 3,147,019 | 9/1964 | Van Trees | 280—16 |
| 3,202,437 | 8/1965 | Masbruch | 188—8 |
| 3,326,569 | 1/1967 | Leeming | 280—16 |

FOREIGN PATENTS

| | | |
|---|---|---|
| 421,240 | 2/1911 | France. |
| 638,773 | 3/1962 | Canada. |

BENJAMIN HERSH, Primary Examiner

R. R. SONG, Assistant Examiner

U.S. Cl. X.R.

188—8